US012786920B2

(12) United States Patent
Kweon

(10) Patent No.: US 12,786,920 B2
(45) Date of Patent: Nov. 3, 2026

(54) METHOD AND APPARATUS FOR SELECTION OF USER PLANE OR CONTROL PLANE FOR USER EQUIPMENT REMOTE PROVISIONING

(71) Applicant: Samsung Electronics Co., Ltd., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 17/986,460

(22) Filed: Nov. 14, 2022

(65) Prior Publication Data

US 2023/0156651 A1 May 18, 2023

(30) Foreign Application Priority Data

Nov. 16, 2021 (KR) ........................ 10-2021-0157858

(51) Int. Cl.
*H04W 60/00* (2009.01)
*H04W 4/50* (2018.01)

(52) U.S. Cl.
CPC ............. *H04W 60/00* (2013.01); *H04W 4/50* (2018.02)

(58) Field of Classification Search
CPC ......... H04W 60/00; H04W 4/50; H04W 8/20; H04W 12/06; H04W 12/69; H04W 84/10; H04W 48/18
See application file for complete search history.

(56) References Cited

U.S. PATENT DOCUMENTS

| | | | | |
|---|---|---|---|---|
| 2019/0007921 | A1* | 1/2019 | Schliwa-Bertling | H04W 76/10 |
| 2020/0359194 | A1 | 11/2020 | Kim et al. | |
| 2021/0058784 | A1 | 2/2021 | Kedalagudde et al. | |
| 2021/0105712 | A1 | 4/2021 | Speicher et al. | |
| 2022/0240210 | A1* | 7/2022 | Lai | H04W 12/06 |

(Continued)

FOREIGN PATENT DOCUMENTS

WO 2021-134107 A2 7/2021

OTHER PUBLICATIONS

Extended European Search Report dated Nov. 25, 2024, issued in European Application No. 22896022.5-1215.

(Continued)

*Primary Examiner* — Marcus Hammonds
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. An operation method of an access and mobility management function (AMF) in a communication network is provided. The method includes receiving, from a base station, a registration request message including information requesting remote provisioning of a user equipment (UE), storing the registration request message, transmitting a registration message including the information requesting remote provisioning of the UE to a unified data management (UDM), based on the registration request message, receiving a response message relating to the registration message from the UDM, and transmitting, to the base station, a registration acceptance message indicating approval of the remote provisioning of the UE, based on the response message.

8 Claims, 13 Drawing Sheets

(56) References Cited

U.S. PATENT DOCUMENTS

| | | | | |
|---|---|---|---|---|
| 2022/0330022 | A1* | 10/2022 | Kolekar | H04W 12/71 |
| 2023/0099786 | A1* | 3/2023 | Xiang | H04W 12/75 370/329 |
| 2023/0189187 | A1* | 6/2023 | Velev | H04W 48/16 455/435.1 |
| 2023/0199632 | A1* | 6/2023 | Talebi Fard | H04W 48/10 455/434 |
| 2024/0008127 | A1* | 1/2024 | Kanneath Abraham | H04W 76/10 |

OTHER PUBLICATIONS

Huawei et al.: KI#4, Sol#30, add the impacts, 3GPP Draft; S2-2008400, 3rd Generation Partnership Project (3GPP), Mobile Competence Centre ; 650, Route Des Lucioles ; F-06921 Sophia-Antipolis Cedex ; France vol. SA WG2, No. XP051952461, e-meeting, Nov. 9, 2020.
3GPP TS 23.501 V16.9.0, 3rd Generation Partnership Project; Technical Specification Group Services and System Aspects; System architecture for the 5G System (5GS); Stage 2 (Release 16), Jun. 2021.
Vivo et al., 'KI#4: conclusions update for CP and UP remote provisioning', S2-2100419, SA WG2 Meeting #143E (e-meeting), Feb. 18, 2021.
Zte et al., 'Clarification on the UE remote provisioning', S2-2108105, SA WG2 Meeting #S2-147E, Oct. 25, 2021.
Ericsson, 'Correction to AMF Onboarding Configuration Data', S2-2108467, 3GPP TSG-SA WG2 Meeting #148E, Nov. 8, 2021.
International Search Report dated Feb. 20, 2023, issued in International Patent Application No. PCT/KR2022/017992.
Korean Office Action dated May 29, 2026, issued in Korean Patent Application No. 10-2021-0157858.

* cited by examiner

METHOD AND APPARATUS FOR SELECTION OF USER PLANE OR CONTROL PLANE FOR USER EQUIPMENT REMOTE PROVISIONING

CROSS-REFERENCE TO RELATED APPLICATION(S)

This application is based on and claims priority under 35 U.S.C. § 119(a) of a Korean patent application number 10-2021-0157858, filed on Nov. 16, 2021, in the Korean Intellectual Property Office, the disclosure of which is incorporated by reference herein in its entirety.

BACKGROUND

1. Field

The disclosure relates to a communication system. More particularly, the disclosure relates to a method and an apparatus for selecting a user plane and a control plane used as a basis to provide remote provisioning for a user equipment (UE) in a case of UE onboarding.

2. Description of Related Art $5^{th}$ generation (5G) mobile communication technologies define broad frequency bands such that high transmission rates and new services are possible, and can be implemented not only in "Sub 6 giga hertz (GHz)" bands, such as 3.5 GHz, but also in "Above 6 GHz" bands referred to as mm Wave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources. As described above, with the development of a mobile communication system, various services may be provided, and thus a scheme for efficiently using a non-public network (NPN) is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus capable of effectively providing a service in a wireless communication system.

According to the disclosure, when a user equipment (UE) performs UE onboarding to receive stand-alone non-public network (SNPN) credentials and user subscription data, an onboarding (ON)-SNPN may transmit UP-based remote provisioning and CP-based remote provisioning to the UE.

Another aspect of the disclosure is to provide a method and an apparatus for selecting a user plane (UP) or a communication processor (CP) used as a basis when the ON-SNPN transmits remote provisioning to a UE.

Another aspect of the disclosure is to provide an apparatus and method for effectively providing a service in a wireless communication system.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
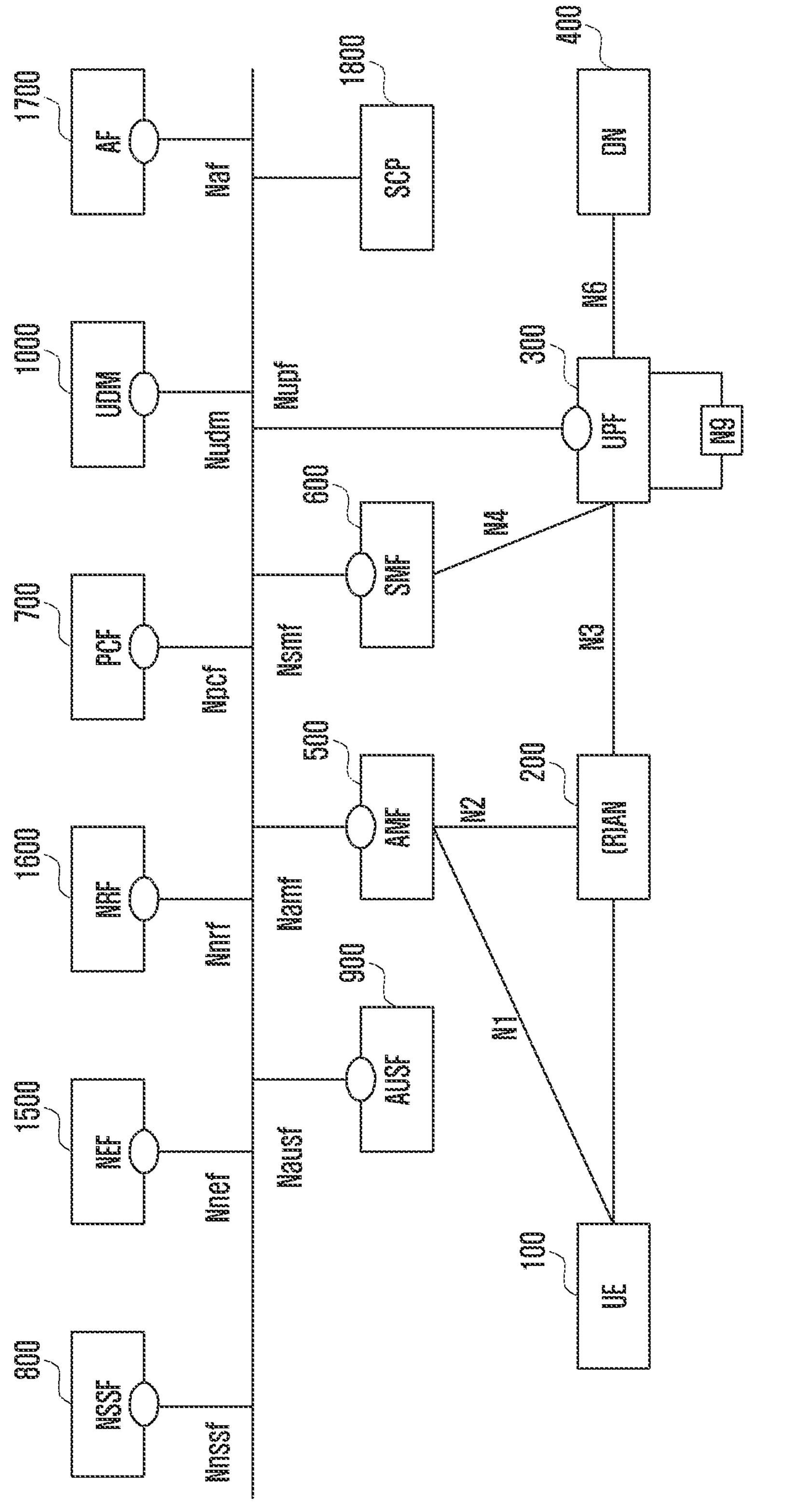
FIG. 1 is a conceptual diagram illustrating a structure of a $5^{th}$ generation (5G) network according to an embodiment of the disclosure.

FIG. 1 is a conceptual diagram illustrating a structure of a 5G network according to an embodiment of the disclosure.

Referring to FIG. 1, the description of network entities or network nodes configuring A 5G network 10 is as follows.

A (radio) access network ((R)AN) 200 is a subject performing radio resource allocation of a terminal 100, and may be at least one of eNode B, Node B, a base station (BS), a next generation radio access network (NG-RAN), a 5G-AN, a radio access unit, a base station controller, or a node on a network. The terminal 100 may include a user equipment (UE), a next generation UE (NG UE), a mobile station (MS), a cellular phone, a smart phone, a computer, or a multimedia system capable of performing a communication function. In addition, although the embodiment of the disclosure will be described below using the 5G system as an example, the embodiment of the disclosure may be applied to other communication systems having a similar technical background. In addition, the embodiments of the disclosure may be applied even to other communication systems through some modifications within a range that does not significantly depart from the scope of the disclosure under the determination of those skilled in the art.

As evolving from a $4^{th}$ generation (4G) system to a 5G system, the wireless communication system defines a new core network, e.g., NextGen core (NG Core) or 5G core network (5GC). In the new core network, all the legacy network entities (NEs) are virtualized into network functions (NFs). According to an embodiment of the disclosure, a network function may imply a network entity, a network component, and a network resource.

According to an embodiment of the disclosure, the 5GC may include NFs 300, 400, 500, 600, 700, 800, 900, 1000, 1500, 1600, 1700, and 1800 as shown in FIG. 1. Without limitations to the example of FIG. 1, the 5GC may include more or fewer NFs than those shown in FIG. 1.

According to an embodiment of the disclosure, an access and mobility management function (AMF) 500 may be a network function of managing the mobility of the UE 100.

According to an embodiment of the disclosure, a session management function (SMF) 600 may be a network function of managing a packet data network (PDN) connection provided to the UE 100. The PDN connection may be referred to as a packet data unit (PDU) session.

According to an embodiment of the disclosure, a policy control function (PCF) 700 may be a network function of applying a service policy, a billing policy, and a PDU session policy of the mobile communication service provider to the UE 100.

According to an embodiment of the disclosure, a unified data management (UDM) 1000 may be a network function of storing information about a subscriber.

According to an embodiment of the disclosure, a network exposure function (NEF) 1500 may be a function of providing information about the UE 100 to a server outside a 5G network. In addition, the NEF 1500 may provide a function of providing information required for a service to the 5G network and of storing the information in a UDR (not shown).

According to an embodiment of the disclosure, a user plane function (UPF) 300 may be a function that serves as a gateway for transferring user data (PDU) to a data network (DN) 400.

According to an embodiment of the disclosure, a network repository function (NRF) 1600 may perform a function of discovering an NF.

According to an embodiment of the disclosure, an authentication server function (AUSF) 900 may perform UE authentication on a third partnership project (3GPP) access network and a non-3GPP access network.

According to an embodiment of the disclosure, a network slice selection function (NSSF) 800 may perform a function of selecting a network slice instance provided to the UE 100.

According to an embodiment of the disclosure, the data network (DN) 400 may be a data network through which the UE 100 performs data transmission and reception in order to use a service of a network operator or a third party service.

Figure 2:
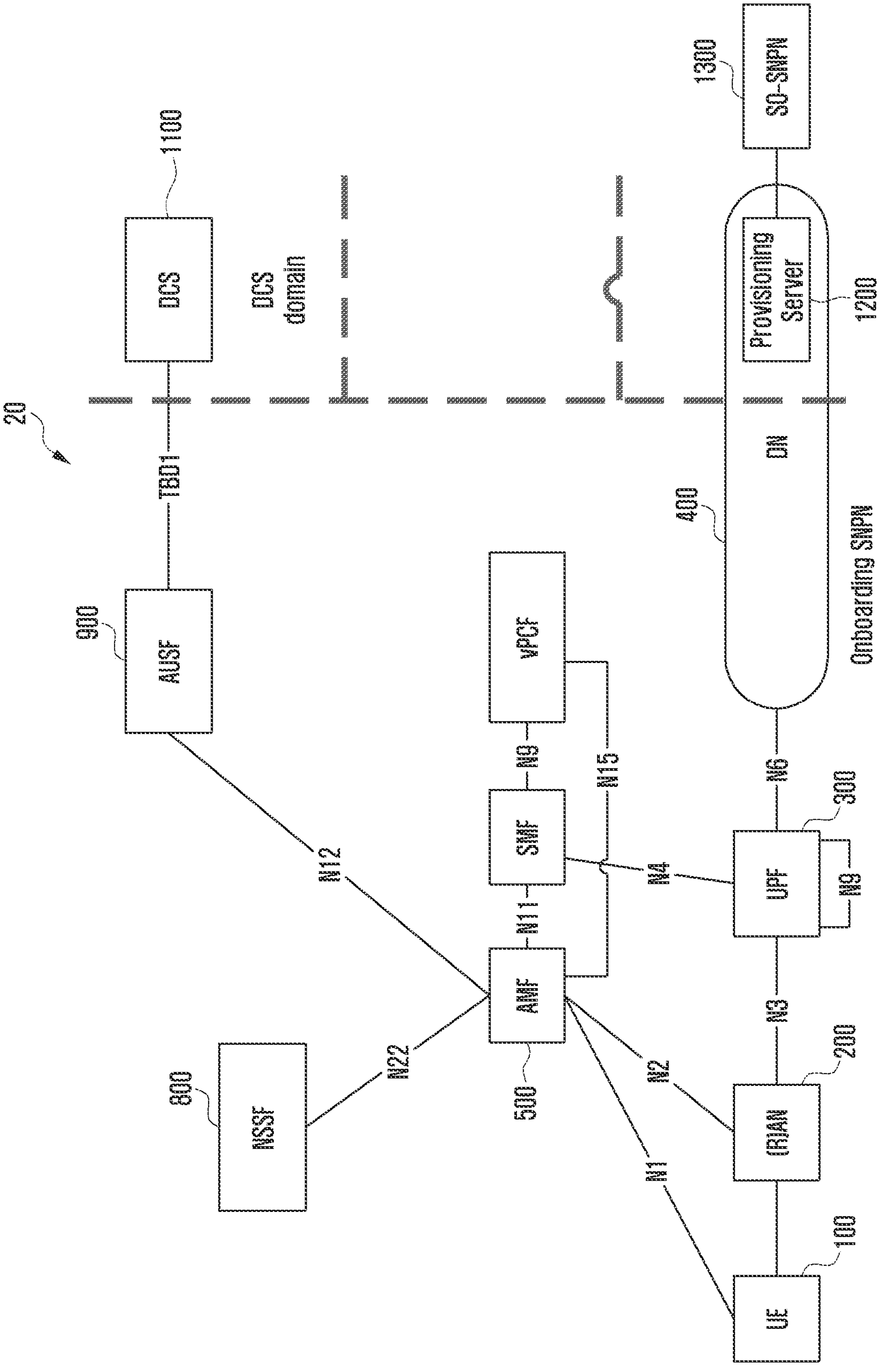
FIG. 2 is a conceptual diagram illustrating a structure of a 5G network according to an embodiment of the disclosure.

FIG. 2 is a conceptual diagram illustrating a structure of a 5G network according to an embodiment of the disclosure.

Referring to FIG. 2, a wireless communication system 10 for transmitting, to a UE 100, standalone NPN (SNPN) credentials and subscriber information for accessing an SNPN 20 may include the UE 100, an onboarding SNPN (ON-SNPN) 20, a default credential server (DCS) 1100, a provisioning server (PVS) 1200, and a subscription owner SNPN (SO-SNPN) 1300 retaining SNPN credentials and subscriber information. FIG. 2 is a conceptual diagram illustrating control plane-based remote provisioning.

First, it is assumed that the UE 100 does not have SNPN credentials and subscriber information (also referred to as user subscription data) and that the UE 100 has default UE credentials allocated by the DCS 1100. In addition, the DCS 1100 may allocate, to the UE 100, a subscription permanent identifier (SUPI) capable of uniquely identifying the UE 100.

In order to enable the UE 100, which lacks SNPN credentials and subscriber information, to receive the SNPN credentials and subscriber information, the ON-SNPN 20 may provide the UE 100 with UP-based IP connectivity (UE onboarding) or CP-based non-access stratum (NAS) connectivity (UE onboarding). In order to determine whether to provide a UE onboarding service to the UE 100, the ON-SNPN may request authentication and authorization for the UE 100 from the DCS 1100. FIG. 2 shows UP-based UE onboarding.

The DCS 1100 may preconfigure, in the UE 100, default UE credentials and SUPI and then store the preconfigured default UE credentials and SUPI. When performing registration for UE onboarding from the ON-SNPN, the DCS 1100 may receive a request for authentication for the UE 100. Here, the authentication and authorization for the UE 100 are performed based on the default UE credentials and SUPI.

In addition, when the PVS 1200 transmits the SNPN credentials and subscriber information to the UE 100, the DCS 1100 may receive a request for UE authentication for the UE 100 from the PVS 1200 to determine whether the UE 100 is a UE having the authority capable of receiving the SNPN credentials and subscriber information. The DCS 1100 may be a manufacturer of the UE 100 or a third party associated with the manufacturer or the SNPN network operator.

The PVS 1200 may receive SNPN credentials and user subscriber information, such as user configuration information from the SO-SNPN 1300 and transmit the received information to the UE.

The PVS 1200, along with the DCS 1100, may exist as one server and, like the DCS 1100, the PVS 1200 may be a server owned by the manufacturer of the UE 100 or a third party associated with the SNPN network operator. The PVS 1200 may perform communication with the DCS 1100 for authentication and authorization of the UE 100.

The SO-SNPN 1300 owning the SNPN credentials and user subscriber information may transmit the SNPN credentials and user subscriber information to the UE 100 through the PVS 1200.

Figure 3:
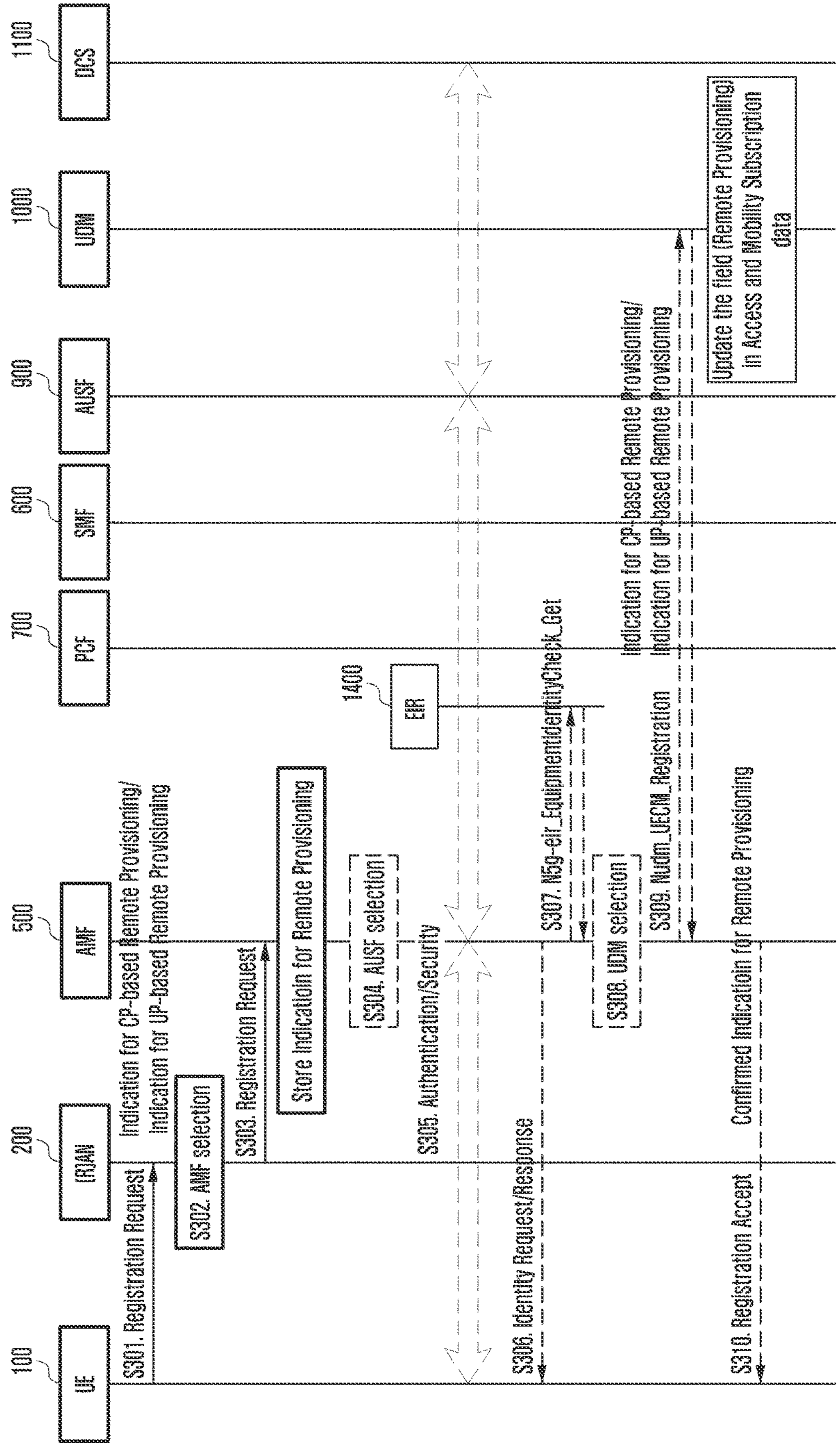
FIG. 3 is a flowchart illustrating a registration procedure when a user equipment (UE) is in an stand-alone non-public network (SNPN) onboarding state according to an embodiment of the disclosure.

FIG. 3 is a flowchart illustrating a registration procedure when a UE is in an SNPN onboarding state according to an embodiment of the disclosure.

Referring to FIG. 3, the UE 100 may request a remote provisioning method.

In operation S301, in order to request a desired remote provisioning method from a network, the UE 100 may transmit a registration request message including an "indication for CP-based remote provisioning" or an "indication for UP-based remote provisioning" to the (R)AN 200. The (R)AN 200 may receive the registration request message from the UE 100.

In operation S302, the (R)AN 200 may select an AMF 500 supporting UE onboarding based on the registration request message. At least one indication included in the registration request message may be included in an access stratum (AS) message. The (R)AN 200 may select the AMF 500 capable of supporting the CP- or UP-based remote provisioning based on the indication for CP-based remote provisioning or the indication for UP-based remote provisioning.

In operation S303, the (R)AN 200 may transmit the registration request message to the AMF 500. The AMF 500 may receive the registration request message from the (R)AN 200. The AMF 500 may store the registration request message. The registration request message may be used later at the time of selection of the SMF 600, for example, selection of the SMF 600 supporting CP- or UP-based provisioning.

In operation S304, the AMF 500 may perform authentication and authorization for the UE 100. In order to perform authentication and authorization for the UE 100, the AMF 500 may select the AUSF 900 based on the SUPI or SUCI information of the UE 100.

In operation S305, when the AMF 500 determines that authentication and authorization for the UE 100 is required, the AMF 500 may transmit a message requesting authentication and authorization for the UE 100 to the AUSF 900 selected in operation S304. The AUSF 900 may receive the message requesting authentication and authorization for the UE 100 from the AMF 500. The AUSF 900 may perform authentication and authorization for the UE 100 through the DCS 1100 based on the message requesting authentication and authorization for the UE 100.

In operation S306, the AMF 500 may transmit, to the UE 100, a message requesting an international mobile equipment identity (IMEI) of the UE 100. The UE 100 may receive the message requesting the IMEI of the UE 100 from the AMF 500. The UE 100 may transmit a response message including the IMEI of the UE 100 to the AMF 500. The AMF 500 may receive, from the UE 100, the response message including the IMEI of the UE 100.

including the indication for CP-based remote provisioning or the indication for UP-based remote provisioning, which corresponds to a remote provisioning indication of the UE 100. The UDM 1000 may receive, from the AMF 500, the message including the indication for CP-based remote provisioning or the indication for UP-based remote provisioning. The UDM 1000 may transmit, to the AMF 500, a response message relating to the message received from the AMF 500. The AMF 500 may receive a response message from the UDM 1000.

The UDM 1000 may store the message including the indication for CP-based remote provisioning or the indication for UP-based remote provisioning. The UDM 1000 may update a remote provisioning field in access and mobility subscription data based on the message including the indication for CP-based remote provisioning or the indication for UP-based remote provisioning.

For example, the access and mobility subscription data may be shown as in Table 1.

TABLE 1

| Subscription data type | Field | Description |
|---|---|---|
| SMF Selection Subscription data (data needed for SMF Selection as described in clause 6.3.2. of TS 23.501 [2]) | SUPI | Key |
| | SMF Selection Subscription data contains one or more S-NSSAI level subscription data: | |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN). |
| | Interworking with EPS indication list | Indicates whether EPS interworking is supported per (S-NSSAI, subscribed DNN). |
| | Same SMF for Multiple PDU Sessions to the same DNN and S-NSSAI | Indication whether the same SMF for multiple PDU Session to the same DNN and S-NSSAI is required. |
| | Invoke NEF indication | When present indicates, per S-NSSAI and per DNN, that NEF based infrequent small data transfer shall be used for the PDU Session (see NOTE 8). |
| | Remote Provisioning | CP-based Remote Provisioning is supported.<br>UP-based Remote Provisioning is supported. |

In operation S307, the AMF 500 may identify the IMEI of the UE 100 through an equipment identity center (EIR) server 1400. The AMF 500 may transmit, to the EIR server 1400, a message (N5g-eir_EquipmentIdentityCheck_Get) requesting identification of the IMEI of the UE 100. The EIR server 1400 may receive, from the AMF 500, the message requesting identification of the IMEI of the UE 100. The EIR server 1400 may transmit a response message relating to the message, which is received from the AMF 500, to the AMF 500. The AMF 500 may receive the response message from the EIR server 1400.

In operation S308, the AMF 500 may select an UDM 1000 in order to store a remote provisioning indication of the UE 100.

In operation S309, the AMF 500 may transmit, to the UDM 1000, a message (Nudm_UECM_Registration)

The remote provisioning field of Table 1 may be newly defined in order to store the remote provisioning method, which is supported by the UE 100 and is received by the UDM 1000 from the AMF 500. The remote provisioning field may be used when the AMF 500 selects the SMF 600 for the UE 100.

In operation S310, the AMF 500 may transmit a registration acceptance message indicating approval of the remote provisioning requested by the UE 100 to the UE 100.

Figure 4:
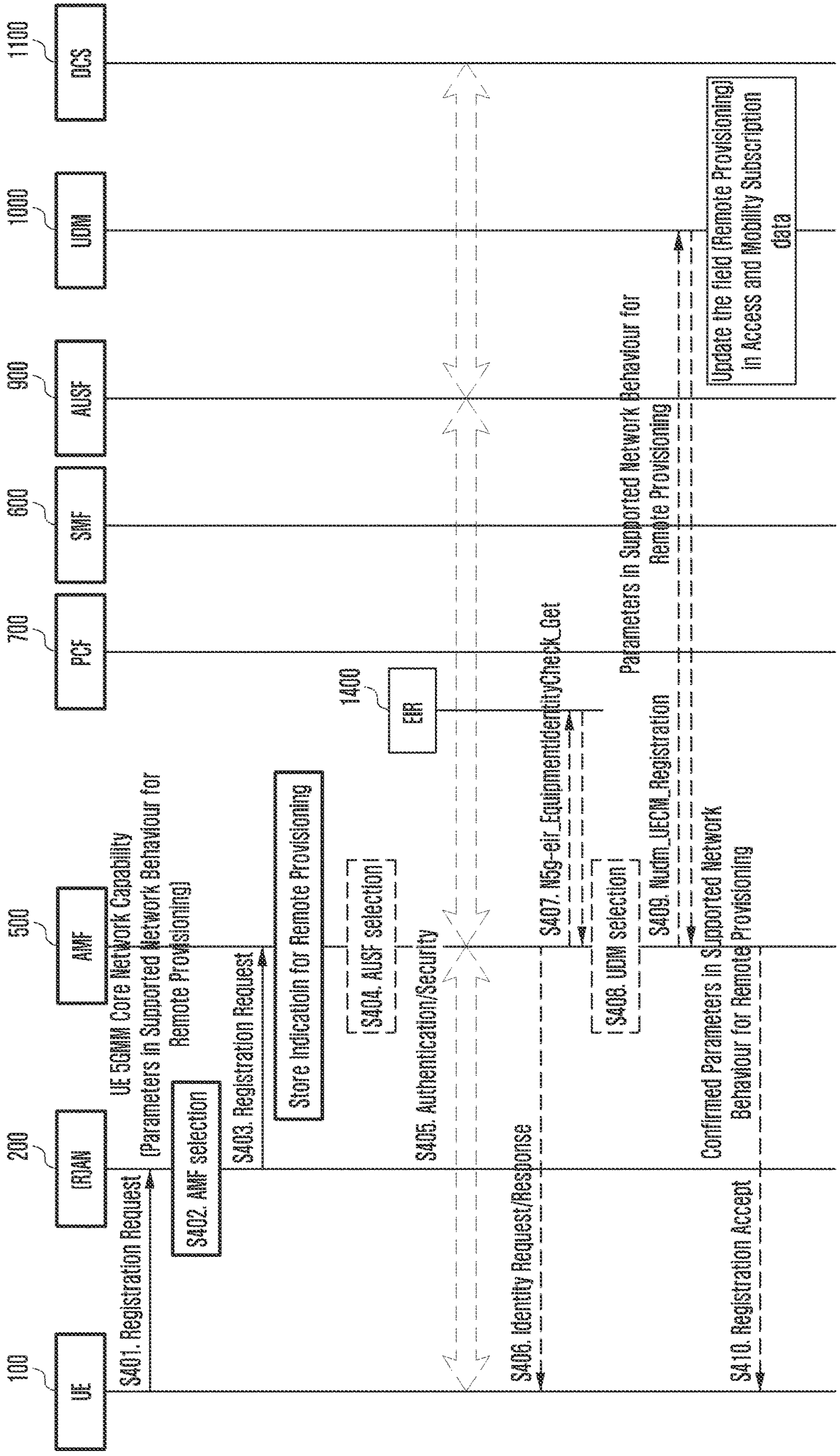
FIG. 4 is a flowchart illustrating a registration procedure when a UE is in an SNPN onboarding state according to an embodiment of the disclosure.

FIG. 4 is a flowchart illustrating a registration procedure when a UE is in an SNPN onboarding state according to an embodiment of the disclosure.

Referring to FIG. 4, the UE 100 may transmit a remote provisioning method usable by the UE 100 to a network, and the network may transmit a registration acceptance message related to the remote provisioning method to the UE 100.

In operation S401, the UE 100 may generate UE 5GMM core network capability information including parameters in supported network behavior for remote provisioning in order to request a remote provisioning method desired by the UE 100. The parameters in supported network behavior for remote provisioning may include whether CP-based remote provisioning is supported, whether UP-based remote provisioning is supported, and information on a method preferred by the UE 100 in case that both the CP-based remote provisioning and UP-based remote provisioning are possible. The UE 5GMM core network capability information may be included in a registration request message. The UE 100 may transmit the registration request message to the (R)AN 200. The (R)AN 200 may receive the registration request message from the UE 100.

In operation S402, the (R)AN 200 may select an AMF 500 supporting UE onboarding based on the registration request message received from the UE 100.

In operation S403, the (R)AN 200 may transmit the registration request message to the AMF 500. The AMF 500 may receive the registration request message from the (R)AN 200. The AMF 500 may store the registration request message. The AMF 500 may use the stored registration request message at the time of selection of the SMF 600 later, for example, at the time of selection of the SMF 600 supporting the CP-or UP-based remote provisioning.

In operation S404, the AMF 500 may perform authentication and authorization for the UE 100. The AMF 500 may select the AUSF 900 based on SUPI or SUCI information of the UE 100 in order to perform authentication and authorization for the UE 100.

In operation S405, when the AMF 500 determines that authentication and authorization for the UE 100 are required, the AMF 500 may transmit a message requesting authentication and authorization for the UE 100 to the AUSF 900 selected in operation S404. The AUSF 900 may receive, from the AMF 500, the message requesting authentication and authorization for the UE 100. The AUSF 900 may perform authentication and authorization for the UE 100 through the DCS 1100 based on the message requesting authentication and authorization for the UE 100 received from the AMF 500.

In operation S406, the AMF 500 may transmit, to the UE 100, a message requesting an international mobile equipment identity (IMEI) of the UE 100. The UE 100 may receive, from the AMF 500, the message requesting the IMEI of the UE 100. The UE 100 may transmit a response message including the IMEI of the UE 100 to the AMF 500. The AMF 500 may receive, from the UE 100, the response message including the IMEI of the UE 100.

In operation S407, the AMF 500 may identify the IMEI of the UE 100 through the equipment identity center (EIR) server 1400. The AMF 500 may transmit a message (N5g-eir_EquipmentIdentityCheck_Get) requesting identification of the IMEI of the UE 100 to the EIR server 1400. The EIR server 1400 may receive, from the AMF 500, the message requesting identification of the IMEI of the UE 100. The EIR server 1400 may transmit a response message relating to the message, which is received from the AMF 500, to the AMF 500. The AMF 500 may receive the response message from the EIR server 1400.

In operation S408, the AMF 500 may select the UDM 1000 to store the remote provisioning indication of the UE 100.

In operation S409, the AMF 500 may transmit a message (Nudm_UECM_Registration) including parameters in supported network behavior for remote provisioning of the UE to the UDM 1000. The UDM 1000 may receive the message including parameters in supported network behavior for remote provisioning from the AMF 500. The UDM 1000 may transmit a response message relating to the message, which is received from the AMF 500, to the AMF 500. The AMF 500 may receive the response message from the UDM 1000.

The UDM 1000 may store a message including parameters in supported network behavior for remote provisioning of the UE 100. The UDM 1000 may update a remote provisioning field in access and mobility subscription data based on the message including parameters in supported network behavior for the remote provisioning of the UE 100. For example, the access and mobility subscription data may be indicated as shown in Table 1.

In operation S410, the AMF 500 may transmit, to the UE 100, a registration acceptance message indicating approval of the parameters in supported network behavior for remote provisioning of the UE 100.

Figure 5:
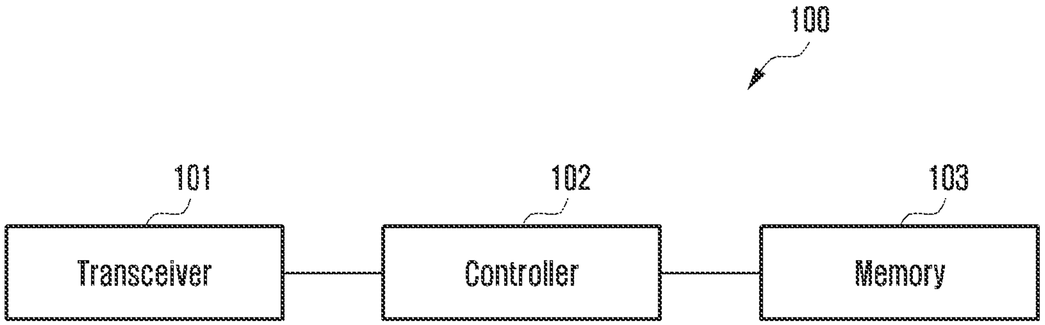
FIG. 5 illustrates a configuration of a UE according to an embodiment of the disclosure.

FIG. 5 illustrates a configuration of a UE according to an embodiment of the disclosure.

The UE 100 according to the disclosure may include a controller 102 for controlling the overall operation of the UE 100, a transceiver 101 including a transmitter and a receiver, and a memory 103. Without limitations to the above example, the UE may include more or fewer configurations than the configuration shown in FIG. 5.

Referring to FIG. 5, the transceiver 101 may perform signal transmission or reception to or from network entities 200, 300, 400, 500, 600, 700, 800, 900, 1000, 1100, 1200, 1400, 1500, 1600, and 1700 or other UEs. Signals transmitted or received to or from the network entities 200, 300, 400, 500, 600, 700, 800, 900, 1000, 1100, 1200, 1400, 1500, 1600, and 1700 may include control information and data. In addition, the transceiver 101 may receive a signal through a radio channel and output the received signal to the controller 102, and may transmit a signal, which is output from the controller 102, through a radio channel.

According to the disclosure, the controller 102 may control the UE 100 to perform the operations of FIGS. 3 and 4 described above. Meanwhile, the controller 102, the memory 103, and the transceiver 101 do not necessarily need to be implemented as separate modules, and may be implemented as a single configuration unit in the form of a single chip. Further, the controller 102 and the transceiver 102 may be electrically connected to each other. In addition, the controller 102 may be an application processor (AP), a communication processor (CP), a circuit, an application-specific circuit, or at least one processor.

According to an embodiment of the disclosure, the memory 103 may store data, such as a basic program, an application program, and configuration information for the operation of the UE 100. More particularly, the memory 103 provides stored data according to the request of the controller 102. The memory 103 may be configured as a storage medium, such as a ROM, a RAM, a hard disk, a CD-ROM, and a DVD, or a combination of storage media. Further, a plurality of memories 103 may exist. In addition, the controller 102 may perform the above-described embodiments based on a program for performing the above-described embodiments of the disclosure stored in the memory 103.

Figure 6:
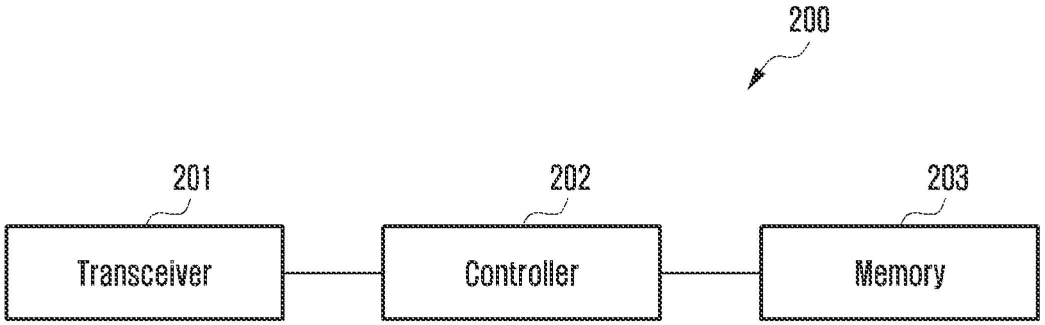
FIG. 6 illustrates a configuration of a base station according to an embodiment of the disclosure.

FIG. 6 illustrates a configuration of a base station according to an embodiment of the disclosure.

The base station 200 according to the disclosure may include a controller 202 for controlling the overall operation of the base station 200, a transceiver 201 including a transmitter and a receiver, and a memory 203. Without limitations to the above example, the base station 200 may include more or fewer configurations than the configuration shown in FIG. 6.

Referring to FIG. 6, the transceiver 201 may perform signal transmission or reception to or from at least one of the UE 100 and other network entities 300, 400, 500, 600, 700, 800, 900, 1000, 1100, 1200, 1400, 1500, 1600, and 1700. Signals transmitted or received to or from at least one of the UE 100 and the other network entities 300, 400, 500, 600, 700, 800, 900, 1000, 1100, 1200, 1400, 1500, 1600, 1700 may include control information and data.

According to the disclosure, the controller 202 may control the base station 200 to perform the operations of FIGS. 3 and 4 described above. Meanwhile, the controller 202, the memory 203, and the transceiver 201 do not necessarily need to be implemented as separate modules, and may be implemented as a single configuration unit in the form of a single chip. Further, the controller 202 and the transceiver 201 may be electrically connected. In addition, the controller 202 may be an application processor (AP), a communication processor (CP), a circuit, an application-specific circuit, or at least one processor.

According to the disclosure, the memory 203 may store data, such as a basic program, an application program, and configuration information for the operation of the base station 200. More particularly, the memory 203 provides stored data according to the request of the controller 202. The memory 203 may be configured as a storage medium, such as a ROM, a RAM, a hard disk, a CD-ROM, and a DVD, or a combination of storage media. In addition, a plurality of memories 203 may exist. In addition, the controller 202 may perform the above-described embodiments based on a program for performing the above-described embodiments of the disclosure stored in the memory 203.

Figure 7:
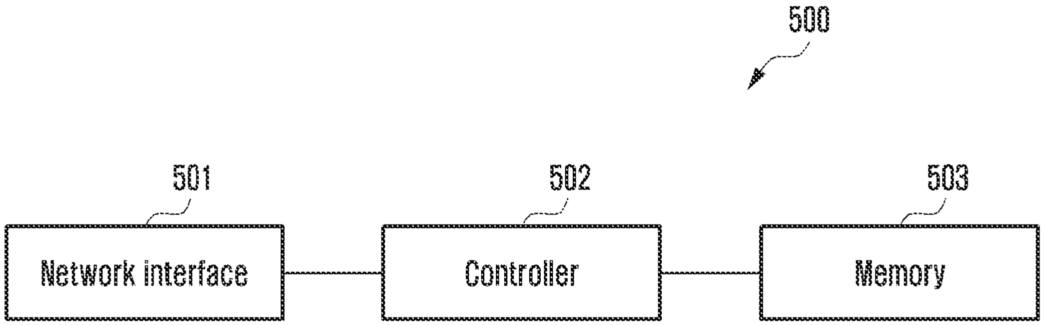
FIG. 7 illustrates a configuration of an access and mobility management function (AMF) according to an embodiment of the disclosure.

FIG. 7 illustrates a configuration of an AMF according to an embodiment of the disclosure.

The AMF 500 according to the disclosure may include a controller 502 for controlling the overall operation of the AMF 500, a network interface 501 including a transmitter and a receiver, and a memory 503. Without limitations to the example above, and the AMF 500 may include more or fewer configurations than those illustrated in FIG. 7.

Referring to FIG. 7, the network interface 501 may perform signal transmission or reception to or from at least one of the UE 100 and other network entities 200, 300, 400, 600, 700, 800, 900, 1000, 1100, 1200, 1400, 1500, 1600, and 1700. Signals transmitted or received to or from at least one of the UE 100 and the other network entities 200, 300, 400, 600, 700, 800, 900, 1000, 1100, 1200, 1400, 1500, 1600, and 1700 may include control information and data.

According to the disclosure, the controller 502 may control the AMF 500 to perform the operations of FIGS. 3 and 4 described above. Meanwhile, the controller 502, the memory 503, and the network interface 501 do not necessarily need to be implemented as separate modules, and may be implemented as a single configuration unit in the form of a single chip. Further, the controller 502 and the network interface 501 may be electrically connected. In addition, the controller 202 may be an application processor (AP), a communication processor (CP), a circuit, an application-specific circuit, or at least one processor.

According to the disclosure, the memory 503 may store data, such as a basic program, an application program, and configuration information for the operation of the AMF 500. More particularly, the memory 503 provides stored data according to the request of the controller 502. The memory 503 may be configured as a storage medium, such as a ROM, a RAM, a hard disk, a CD-ROM, and a DVD, or a combination of storage media. In addition, a plurality of memories 503 may exist. In addition, the controller 502 may perform the above-described embodiments based on a program for performing the above-described embodiments of the disclosure stored in the memory 503.

Figure 8:
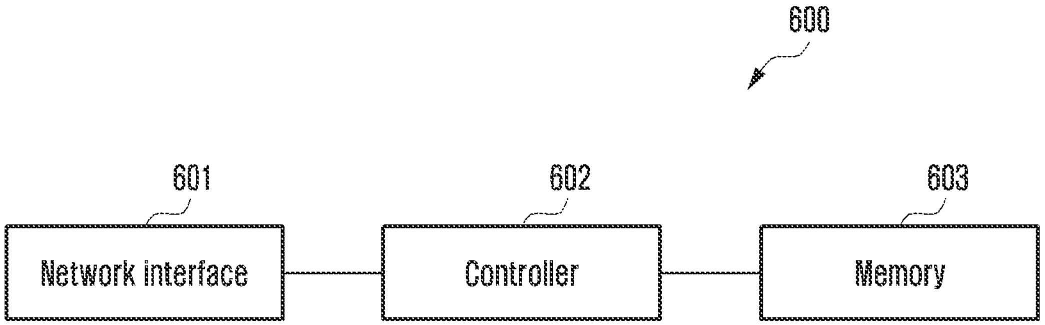
FIG. 8 illustrates a configuration of an session management function (SMF) according to an embodiment of the disclosure.

FIG. 8 illustrates a configuration of an SMF according to an embodiment of the disclosure.

The SMF 600 according to the disclosure may include a controller 602 for controlling the overall operation of the SMF 600, a network interface 601 including a transmitter and a receiver, and a memory 603. Without limitations to the example above, and the SMF 600 may include more or fewer configurations than those illustrated in FIG. 8.

Referring to FIG. 8, the network interface 601 may perform signal transmission or reception to or from at least one of the UE 100 and other network entities 200, 300, 400, 500, 700, 800, 900, 1000, 1100, 1200, 1400, 1500, 1600, and 1700. Signals transmitted or received to or from at least one of the UE 100 and the other network entities 200, 300, 400, 500, 700, 800, 900, 1000, 1100, 1200, 1400, 1500, 1600, and 1700 may include control information and data.

According to the disclosure, the controller 602 may control the SMF 600 to perform the operations of FIGS. 3 and 4 described above. Meanwhile, the controller 602, the memory 603, and the network interface 601 do not necessarily need to be implemented as separate modules, and may be implemented as a single configuration unit in the form of a single chip. Further, the controller 602 and the network interface 601 may be electrically connected. In addition, the controller 602 may be an application processor (AP), a communication processor (CP), a circuit, an application-specific circuit, or at least one processor.

According to the disclosure, the memory 603 may store data, such as a basic program, an application program, and configuration information for the operation of the SMF 600. More particularly, the memory 603 provides stored data according to the request of the controller 602. The memory 603 may be configured as a storage medium, such as a ROM, a RAM, a hard disk, a CD-ROM, and a DVD, or a combination of storage media. In addition, a plurality of memories 503 may exist. In addition, the controller 602 may perform the above-described embodiments based on a program for performing the above-described embodiments of the disclosure stored in the memory 603.

Figure 9:
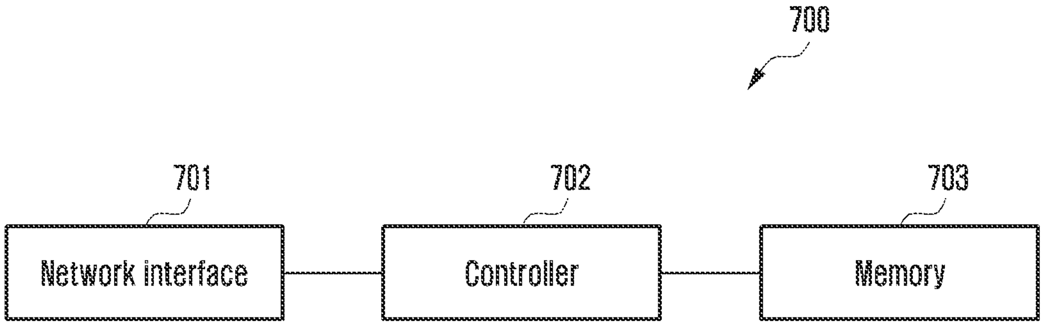
FIG. 9 illustrates a configuration of a policy control function (PCF) according to an embodiment of the disclosure.

FIG. 9 illustrates a configuration of a PCF according to an embodiment of the disclosure.

The PCF 700 according to the disclosure may include a controller 702 for controlling the overall operation of the PCF 700, a network interface 701 including a transmitter and a receiver, and a memory 703. Without limitations to the example above, and the PCF 700 may include more or fewer configurations than those illustrated in FIG. 9.

Referring to FIG. 9, the network interface 701 may perform signal transmission or reception to or from at least one of the UE 100 and other network entities 200, 300, 400, 500, 600, 800, 900, 1000, 1100, 1200, 1400, 1500, 1600, and 1700. Signals transmitted or received to or from at least one of the UE 100 and the other network entities 200, 300, 400, 500, 600, 800, 900, 1000, 1100, 1200, 1400, 1500, 1600, and 1700 may include control information and data.

According to the disclosure, the controller 702 may control the PCF 700 to perform the operations of FIGS. 3 and 4 described above. Meanwhile, the controller 702, the memory 703, and the network interface 701 do not necessarily need to be implemented as separate modules, and may be implemented as a single configuration unit in the form of a single chip. Further, the controller 702 and the network interface 701 may be electrically connected. In addition, the controller 702 may be an application processor (AP), a communication processor (CP), a circuit, an application-specific circuit, or at least one processor.

According to the disclosure, the memory 703 may store data, such as a basic program, an application program, and configuration information for the operation of the PCF 700. More particularly, the memory 703 provides stored data according to the request of the controller 702. The memory 703 may be configured as a storage medium, such as a ROM, a RAM, a hard disk, a CD-ROM, and a DVD, or a combination of storage media. In addition, a plurality of memories 703 may exist. In addition, the controller 702 may perform the above-described embodiments based on a program for performing the above-described embodiments of the disclosure stored in the memory 703.

Figure 10:
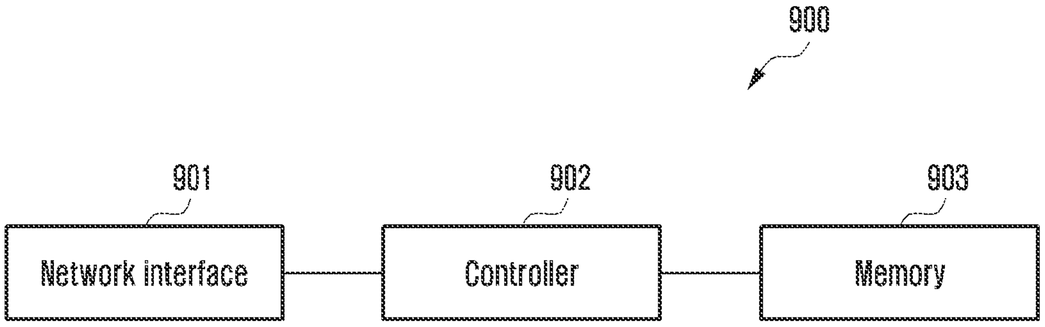
FIG. 10 illustrates a configuration of an authentication server function (AUSF) according to an embodiment of the disclosure.

FIG. 10 illustrates a configuration of an AUSF according to an embodiment of the disclosure.

The AUSF 900 according to the disclosure may include a controller 902 for controlling the overall operation of the AUSF 900, a network interface 901 including a transmitter and a receiver, and a memory 903. Without limitations to the example above, and the AUSF 900 may include more or fewer configurations than those illustrated in FIG. 10.

Referring to FIG. 10, the network interface 901 may perform signal transmission or reception to or from at least one of the UE 100 and other network entities 200, 300, 400, 500, 600, 700, 800, 1000, 1100, 1200, 1400, 1500, 1600, and 1700. Signals transmitted or received to or from at least one of the UE 100 and the other network entities 200, 300, 400, 500, 600, 700, 800, 1000, 1100, 1200, 1400, 1500, 1600, and 1700 may include control information and data.

According to the disclosure, the controller 902 may control the AUSF 900 to perform the operations of FIGS. 3 and 4 described above. Meanwhile, the controller 902, the memory 903, and the network interface 901 do not necessarily need to be implemented as separate modules, and may be implemented as a single configuration unit in the form of a single chip. Further, the controller 902 and the network interface 901 may be electrically connected. In addition, the controller 902 may be an application processor (AP), a communication processor (CP), a circuit, an application-specific circuit, or at least one processor.

According to the disclosure, the memory 903 may store data, such as a basic program, an application program, and configuration information for the operation of the AUSF 900. More particularly, the memory 903 provides stored data according to the request of the controller 902. The memory 903 may be configured as a storage medium, such as a ROM, a RAM, a hard disk, a CD-ROM, and a DVD, or a combination of storage media. In addition, a plurality of memories 903 may exist. In addition, the controller 902 may perform the above-described embodiments based on a program for performing the above-described embodiments of the disclosure stored in the memory 903.

Figure 11:
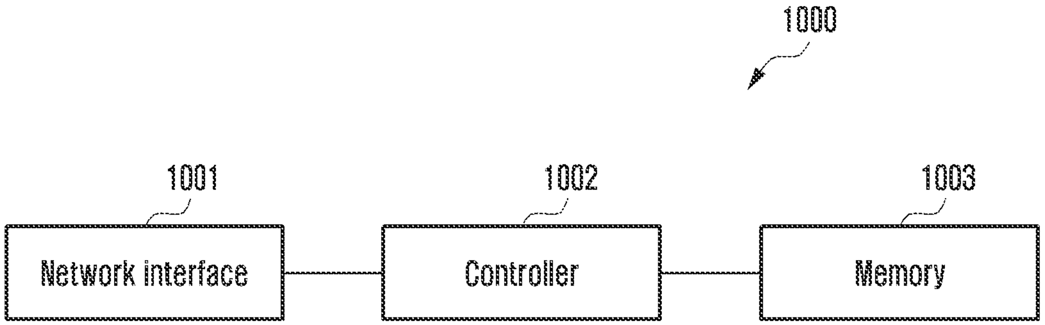
FIG. 11 illustrates a configuration of a unified data management (UDM) according to an embodiment of the disclosure.

FIG. 11 illustrates a configuration of a UDM according to an embodiment of the disclosure.

The UDM 1000 according to the disclosure may include a controller 1002 for controlling the overall operation of the UDM 1000, a network interface 1001 including a transmitter and a receiver, and a memory 1003. Without limitations to the example above, and the UDM 1000 may include more or fewer configurations than those illustrated in FIG. 11.

Referring to FIG. 11, the network interface 1001 may perform signal transmission or reception to or from at least one of the UE 100 and other network entities 200, 300, 400, 500, 600, 700, 800, 900, 1100, 1200, 1400, 1500, 1600, and 1700. Signals transmitted or received to or from at least one of the UE 100 and the other network entities 200, 300, 400, 500, 600, 700, 800, 900, 1100, 1200, 1400, 1500, 1600, and 1700 may include control information and data.

According to the disclosure, the controller 1002 may control the UDM 1000 to perform the operations of FIGS. 3 and 4 described above. Meanwhile, the controller 1002, the memory 1003, and the network interface 1001 do not necessarily need to be implemented as separate modules, and may be implemented as a single configuration unit in the form of a single chip. Further, the controller 1002 and the network interface 1001 may be electrically connected. In addition, the controller 1002 may be an application processor (AP), a communication processor (CP), a circuit, an application-specific circuit, or at least one processor.

According to the disclosure, the memory 1003 may store data, such as a basic program, an application program, and configuration information for the operation of the UDM 1000. More particularly, the memory 1003 provides stored data according to the request of the controller 1002. The memory 1003 may be configured as a storage medium, such as a ROM, a RAM, a hard disk, a CD-ROM, and a DVD, or a combination of storage media. In addition, a plurality of memories 1003 may exist. In addition, the controller 1002 may perform the above-described embodiments based on a program for performing the above-described embodiments of the disclosure stored in the memory 1003.

Figure 12:
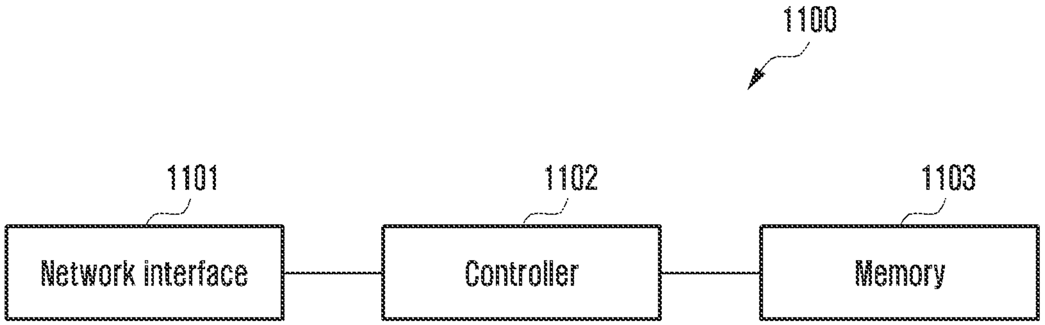
FIG. 12 illustrates a configuration of a default credential server (DCS) according to an embodiment of the disclosure.

FIG. 12 illustrates a configuration of a DCS according to an embodiment of the disclosure.

The DCS 1100 according to the disclosure may include a controller 1202 for controlling the overall operation of the DCS 1100, a network interface 1101 including a transmitter and a receiver, and a memory 1103. Without limitations to the example above, and the DCS 1100 may include more or fewer configurations than those illustrated in FIG. 12.

Referring to FIG. 12, the network interface 1101 may perform signal transmission or reception to or from at least one of the UE 100 and other network entities 200, 300, 400, 500, 600, 700, 800, 900, 1000, 1200, 1400, 1500, 1600, and 1700. Signals transmitted or received to or from at least one of the UE 100 and the other network entities 200, 300, 400, 500, 600, 700, 800, 900, 1000, 1200, 1400, 1500, 1600, and 1700 may include control information and data.

According to the disclosure, the controller 1102 may control the DCS 1100 to perform the operations of FIGS. 3 and 4 described above. Meanwhile, the controller 1102, the memory 1103, and the network interface 1101 do not necessarily need to be implemented as separate modules, and may be implemented as a single configuration unit in the form of a single chip. Further, the controller 1102 and the network interface 1101 may be electrically connected. In addition, the controller 1102 may be an application processor (AP), a communication processor (CP), a circuit, an application-specific circuit, or at least one processor.

According to the disclosure, the memory 1103 may store data, such as a basic program, an application program, and configuration information for the operation of the DCS 1100. More particularly, the memory 1103 provides stored data according to the request of the controller 1002. The memory 1103 may be configured as a storage medium, such as a ROM, a RAM, a hard disk, a CD-ROM, and a DVD, or a combination of storage media. In addition, a plurality of memories 1103 may exist. In addition, the controller 1102 may perform the above-described embodiments based on a program for performing the above-described embodiments of the disclosure stored in the memory 1103.

Figure 13:
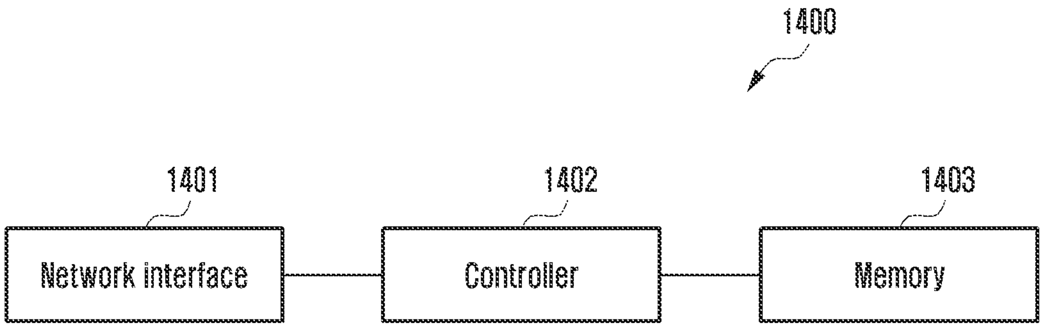
FIG. 13 illustrates a configuration of an equipment identity center (EIR) server according to an embodiment of the disclosure.

FIG. 13 illustrates a configuration of an EIR server according to an embodiment of the disclosure.

The EIR server 1400 according to the disclosure may include a controller 1402 for controlling the overall operation of the EIR server 1400, a network interface 1401 including a transmitter and a receiver, and a memory 1403. Without limitations to the example above, and the EIR server 1400 may include more or fewer configurations than those illustrated in FIG. 13.

Referring to FIG. 13, the network interface 1401 may perform signal transmission or reception to or from at least one of the UE 100 and other network entities 200, 300, 400, 500, 600, 700, 800, 900, 1000, 1100, 1200, 1500, 1600, and 1700. Signals transmitted or received to or from at least one of the UE 100 and the other network entities 200, 300, 400, 500, 600, 700, 800, 900, 1000, 1100, 1200, 1500, 1600, and 1700 may include control information and data.

According to the disclosure, the controller 1402 may control the EIR server 1400 to perform the operations of FIGS. 3 and 4 described above. Meanwhile, the controller 1402, the memory 1403, and the network interface 1401 do not necessarily need to be implemented as separate modules, and may be implemented as a single configuration unit in the form of a single chip. Further, the controller 1402 and the network interface 1401 may be electrically connected. In addition, the controller 1402 may be an application processor (AP), a communication processor (CP), a circuit, an application-specific circuit, or at least one processor.

According to the disclosure, the memory 1403 may store data, such as a basic program, an application program, and configuration information for the operation of the EIR server 1400. More particularly, the memory 1403 provides stored data according to the request of the controller 1402. The memory 1403 may be configured as a storage medium, such as a ROM, a RAM, a hard disk, a CD-ROM, and a DVD, or a combination of storage media. In addition, a plurality of memories 1403 may exist. In addition, the controller 1402 may perform the above-described embodiments based on a program for performing the above-described embodiments of the disclosure stored in the memory 1403.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating an access and mobility management function (AMF) in a communication network, the method comprising:

receiving, from a user equipment (UE) through a base station, a registration request message including information requesting remote provisioning of the UE and remote provisioning indications of the UE, wherein the remote provisioning indications are determined by the UE and include an indication for requesting control plane (CP)-based remote provisioning or an indication for requesting user plane (UP)-based remote provisioning;

storing the registration request message including the remote provisioning indications of the UE;

transmitting, to the UE, a message requesting an international mobile equipment identity, IMEI, of the UE;

receiving, from the UE, a response message including the IMEI of the UE;

selecting a unified data management (UDM) to store the remote provisioning indications of the UE related to the information requesting remote provisioning;

transmitting a registration message including the remote provisioning indications of the UE to the UDM, based on the registration request message;

receiving a response message relating to the registration message from the UDM; and transmitting, to the base station, a registration acceptance message indicating approval of the remote provisioning of the UE, based on the response message, wherein a remote provisioning field in access and mobility subscription data is updated by the UDM, based on the remote provisioning indications.

2. The method of claim 1, wherein the information requesting remote provisioning of the UE comprises parameters in supported network behavior for remote provisioning.

3. The method of claim 2, wherein the parameters comprise information indicating whether a CP-based remote provisioning method is supported, information indicating whether an UP-based remote provisioning method is supported, and information indicating a method preferred in case that both the CP-based and UP-based remote provisioning methods are supported.

4. The method of claim 1, wherein the registration request message is transmitted from the UE to the base station, wherein the AMF for supporting an onboarding standalone non-public network (SNPN) is determined by the base station, based on the registration request message, and wherein the registration acceptance message is transmitted from the base station to the UE.

5. An access and mobility management function (AMF) in a communication network, the AMF comprising:

a transceiver configured to transmit and receive a signal; and a processor coupled to the transceiver, wherein the processor is configured to:

receive, from a user equipment (UE) through a base station, a registration request message including information requesting remote provisioning of a user equipment (UE) and remote provisioning indications of the UE, wherein the remote provisioning indications are determined by the UE and include an indication for requesting control plane (CP)-based remote provisioning or an indication for requesting user plane (UP)-based remote provisioning, store the registration request message including the remote provisioning indications of the UE, transmit, to the UE, a message requesting an international mobile equipment identity, IMEI, of the UE, receive, from the UE, a response message including the IMEI of the UE, select a unified data management (UDM) to store the remote provisioning indications of the UE, transmit a registration message including the remote provisioning indications of the UE to the UDM, based on the registration request message, receive a response message relating to the registration message from the UDM, and transmit, to the base station, a registration acceptance message indicating approval of the remote provisioning of the UE, based on the response message, and wherein a remote provisioning field in access and mobility subscription data is updated by the UDM, based on the remote provisioning indications.

6. The AMF of claim 5, wherein the information requesting remote provisioning of the UE comprises parameters in supported network behavior for remote provisioning.

7. The AMF of claim 6, wherein the parameters comprise information indicating whether a CP-based remote provisioning method is supported, information indicating whether an UP-based remote provisioning method is supported, and information indicating a method preferred in case that both the CP-based and UP-based remote provisioning methods are supported.

8. The AMF of claim 5, wherein the registration request message is transmitted from the UE to the base station, wherein the AMF for supporting an onboarding standalone non-public network (SNPN) is determined by the base station, based on the registration request message, and wherein the registration acceptance message is transmitted from the base station to the UE.

* * * * *